Nov. 22, 1960 A. MACOVSKI 2,961,484

SYNCHRONOUS COLOR KILLER SYSTEM FOR TV RECEIVERS

Filed April 9, 1957 3 Sheets-Sheet 1

INVENTOR.
ALBERT MACOVSKI
BY [signature]
ATTORNEY

Nov. 22, 1960 A. MACOVSKI 2,961,484

SYNCHRONOUS COLOR KILLER SYSTEM FOR TV RECEIVERS

Filed April 9, 1957 3 Sheets-Sheet 2

INVENTOR.
ALBERT MACOVSKI
BY
ATTORNEY

Nov. 22, 1960 A. MACOVSKI 2,961,484

SYNCHRONOUS COLOR KILLER SYSTEM FOR TV RECEIVERS

Filed April 9, 1957 3 Sheets-Sheet 3

INVENTOR.
ALBERT MACOVSKI

BY [signature]

ATTORNEY

United States Patent Office 2,961,484

Patented Nov. 22, 1960

2,961,484

SYNCHRONOUS COLOR KILLER SYSTEM FOR TV RECEIVERS

Albert Macovski, Massapequa, N.Y., assignor to Radio Corporation of America, a corporation of Delaware Filed Apr. 9, 1957, Ser. No. 651,625

9 Claims. (Cl. 178—5.4)

This invention relates to color television receivers, and more particularly to color killer means in a color television receiver for deactivating the color signal developing portion of the receiver when the received signal is a monochrome signal not including color subcarrier frequency bursts.

According to one color killer system presently in use, the portion of the received signal occurring during the time interval allotted to color subcarrier frequency bursts is separated, amplified, and rectified to provide a color killer control (CKC) voltage having zero amplitude when bursts are absent, and having an amplitude proportional to the amplitude of bursts when bursts are present. This CKC voltage is employed to control a color killer triode which in turn provides a color killer (CK) voltage. The CK voltage is applied to one of the chroma amplifier stages as a bias which either cuts off the amplifier or permits chroma signals to be passed by the amplifier.

The above-described color killer system operates in response to the amplitude, during burst time, of the received signal. It is also known to employ a synchronous color killer system which operates solely in response to receipt of a signal during burst time which is synchronous with the color subcarrier reference oscillator in the receiver. The receiver includes means for maintaining the oscillator in synchronism with bursts when bursts are received. Therefore, a synchronous color killer which responds only to receipt of a synchronous signal (bursts) during burst time is immune to noise on the received signal.

A synchronous color killer system includes a phase detector means to compare the output of the oscillator with the signal received during burst time to determine whether it is a burst, i.e., whether it is synchronous with the oscillator output. Known synchronous color killer systems have also included an amplifying device, such as a triode vacuum tube, responsive to the output of the phase detector means and operative to supply controlling bias to the chroma amplifier.

It is a general object of this invention to provide an improved synchronous color killer system requiring fewer circuit components than have been necessary in the past.

The invention may, for example, be incorporated in a color television receiver having a burst-controlled reference oscillator which is maintained in synchronism and fixed phase with the received bursts by means of an automatic phase and frequency control (APFC) loop including a balanced phase detector and a reactance tube. An unbalance point in the APFC phase detector provides a rectified direct current voltage proportional to the amplitude of bursts. This voltage is applied to input electrodes of a triode in such polarity as to bias the triode in the non-conducting direction. The triode is energized with plate voltage only during the burst time by means of a flyback pulse from the deflection circuit. The received bursts and the reference oscillations are coupled to input electrodes of the triode in subtractive phases. That is, the phases are such that when bursts are present, they tend to cancel the conduction in the tube which would otherwise be caused by the oscillations. Therefore, when bursts are present, the triode is biased in the non-conducting direction by the direct current voltage from the APFC phase detector, and the bursts subtract from the oscillations applied to the triode. Thus, the triode is cut off when bursts are present on the received signal. When bursts are absent, or when noise is received during burst time, the triode conducts. The output circuit of the triode provides a color killer voltage for application, without further amplification, to the grid of a chroma amplifier. Therefore, the addition of the triode provides synchronous color killer operation and eliminates the need for the amplifying triode employed in prior art arrangements. The invention may also be incorporated in receivers having other types of APFC phase detectors, or may employ an independent rectifying device to rectify the bursts and provide the reverse biasing voltage for the triode.

This and other objects and aspects of the invention will be apparent to those skilled in the art from the following more detailed description taken in conjunction with the appended drawings, wherein.

Figure 1:
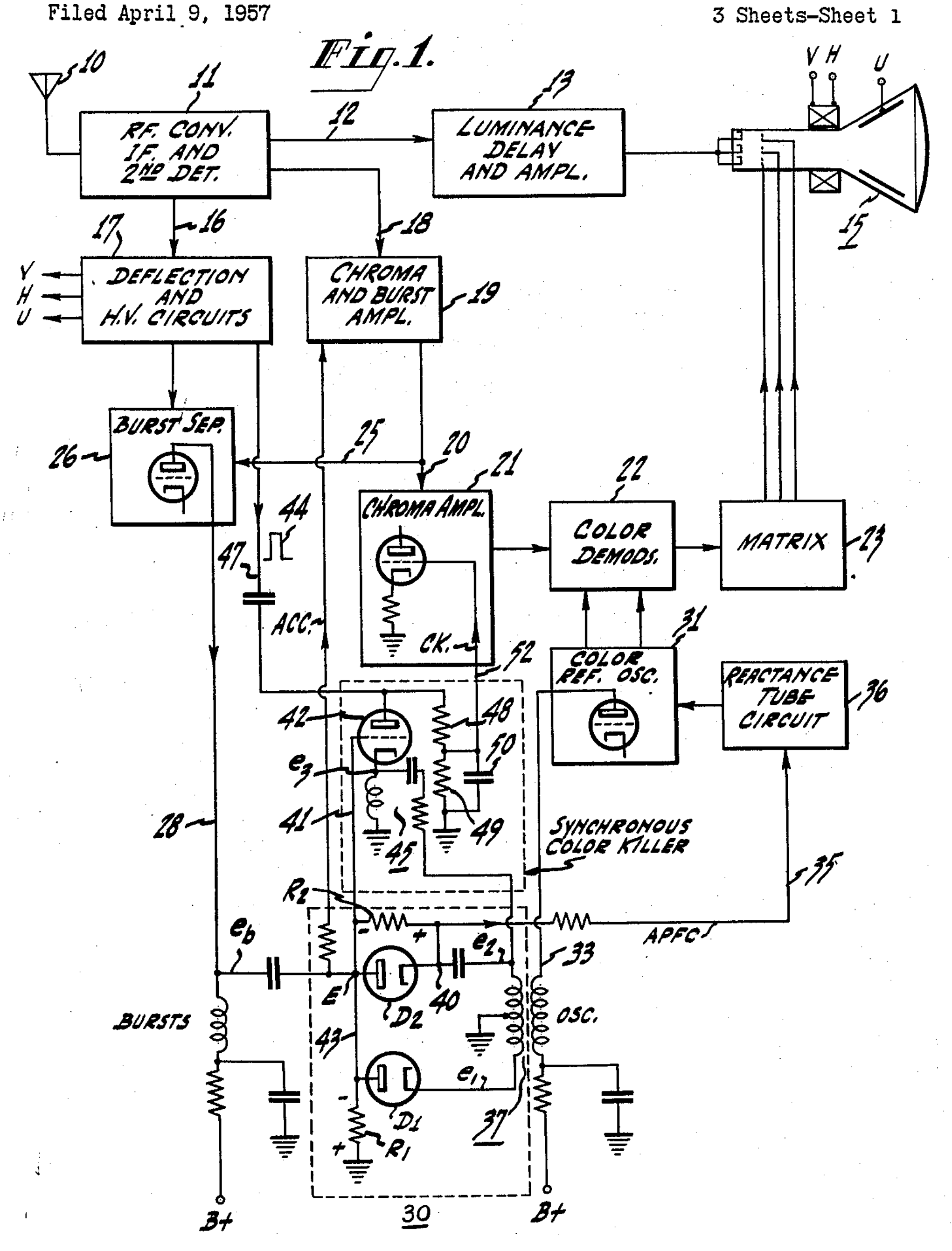
Figure 1 is a color television receiver wherein conventional circuits are shown in block diagram form and wherein the portion including the synchronous color killer according to this invention is shown in circuit diagram form.

Referring to the color television receiver system shown in Figure 1, a signal received by an antenna 10 is applied to a television signal receiver 11 which includes a radio frequency amplifier, a converter, an intermediate frequency amplifier and a second detector. One output (not shown) from the receiver 11 is employed to reproduce the audio portion of the received signal. Another output of the receiver 11 is applied through a line 12 and a luminance delay and amplifying circuit 13 to the cathodes of a color kinescope 15. A third output from the receiver 11 is applied over line 16 to deflection and high voltage circuits 17. Vertical deflection waves, horizontal deflection waves and an ultor voltage are coupled from the outputs V, H and U, respectively, of the circuits 17 to the correspondingly designated terminals of the color kinescope 15.

A fourth output from the receiver 11 is applied over a line 18 to a chroma and burst amplifier 19. A chroma signal from amplifier 19 is applied over line 20 to a chroma amplifier 21 from which an amplified chroma signal is applied to color demodulators 22. The demodulated signals from the demodulators 22 are applied to a matrix 23 from which three color difference signals are coupled to respective grids of the three gun color kinescope 15.

The output from the chroma and burst amplifier 19 is also applied over line 25 to a burst separator 26. The burst separator receives a gating signal from the circuits 17 and delivers separated bursts on lead 28 to an APFC phase detector 30. A color reference oscillator 31 supplies demodulating reference signals to the color demodulators 22, and also supplies oscillations over lead 33 to the APFC phase detector 30. An APFC voltage from the phase detector 30 is applied over lead 35 to a reactance tube 36 which maintains the color reference oscillator 31 in synchronism and fixed phase with the received bursts.

Figure 2A:
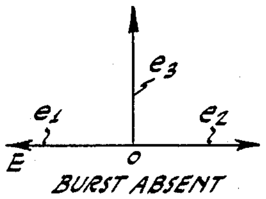
Figures 2A and 2B are vector diagrams which will be referred to in describing the operation of the invention.

The APFC phase detector 30 is an adder type phase detector wherein the oscillations from the oscillator 31 are coupled in opposite phases $e_1$ and $e_2$ by means of transformer 37 to the cathodes of diodes $D_1$ and $D_2$, respectively, and wherein the bursts are coupled at phase $e_b$ to the anodes of diodes $D_1$ and $D_2$. The APFC loop, including the phase detector 30, the reactance tube 36 and the color reference oscillator 31, are initially adjusted, in the absence of bursts, so that the frequency of the reference oscillator 31 is equal to the standard frequency of the bursts (3.58 megacycles) with zero voltage appearing at the balance point 40. Under this condition, the D.C. voltages across resistors R1 and R2 are equal and of opposite polarity so that a negative D.C. voltage appears at the unbalance point 43. This condition is illustrated in the vector diagram of Figure 2A showing the opposite oscillator phases $e_1$ and $e_2$ which result in a D.C. voltage E, which is proportional to $e_1$, at the point 43.

Figure 2B:
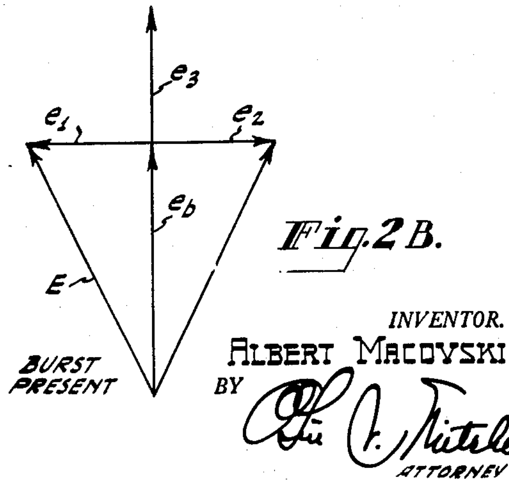

Figure 2B shows the conditions when bursts $e_b$ are applied over lead 28 to the phase detector 30. The APFC output of the phase detector acts through the reactance tube circuit 36 to make the oscillator phases $e_1$ and $e_2$ in quadrature with the burst $e_b$. Now a larger negative D.C. voltage E, obtained by rectification of the vector sum of $e_1$ and $e_b$, is generated at the unbalance point 43. The voltage E is obtained by applying the oscillations $e_1$ and the bursts $e_b$ in additive phases (quadrature phases in the present example) to a rectifying device $D_1$ having a load resistor R1. The term additive phases is intended to mean amplitude and phase relations such that rectification of the vector sum of the bursts and oscillations provides a greater rectified voltages than rectification of oscillations alone. The negative D.C. voltage E is applied over lead 41 to the grid of a vacuum tube 42. Since voltage E is negative and is applied to the grid electrode of tube 42, the voltage E biases amplifying device 42 in the non-conducting direction.

The bursts are applied over leads 28 and 41 to the grid of the tube 42. The oscillations at phase $e_2$ are applied through a 90 degree phase shifting network 45, including a series resistor and capacitor and a shunt inductor, to the cathode of tube 42. The oscillations on the cathode of tube 42 are at phase $e_3$ as shown in Figures 2A and 2B. Since the oscillations $e_3$ applied to the cathode are in the same phase as the bursts $e_b$ applied to the grid, the oscillations and bursts are applied to the amplifier device in subtractive phases because the effect of the burst $e_b$ is to subtract from the effect of the oscillations $e_1$ so far as causing conduction in the amplifier device 42 is concerned. The oscillations $e_3$ and the bursts $e_b$ may be said to be in anti-quadrature phase relation because they are in the same phase. The term anti-quadrature phase also applies to two signals which are 180 degrees out of phase.

Positive flyback pulses 44 occurring during burst time are obtained from the deflection and high voltage circuits 17 and applied over lead 47 to the anode of tube 42. The tube 42 is thus energized with plate voltage solely during burst time. The anode of tube 42 is connected to an output circuit including a resistor 48 in series with a resistor 49 and a capacitor 50 in parallel. The values of the output circuit components are selected to have a time constant so that, although tube 42 can conduct only during burst time, a steady negative D.C. voltage, or zero voltage, is developed on the color killer (CK) lead 52. The CK voltage is applied directly, without amplification, to the control grid of an amplifier stage in the chroma amplifier 21. An automatic chroma control (ACC) voltage is obtained from the unbalance point 43 and applied to the chroma and burst amplifier 19.

Figures 3A, 3B, 3C, 3D:
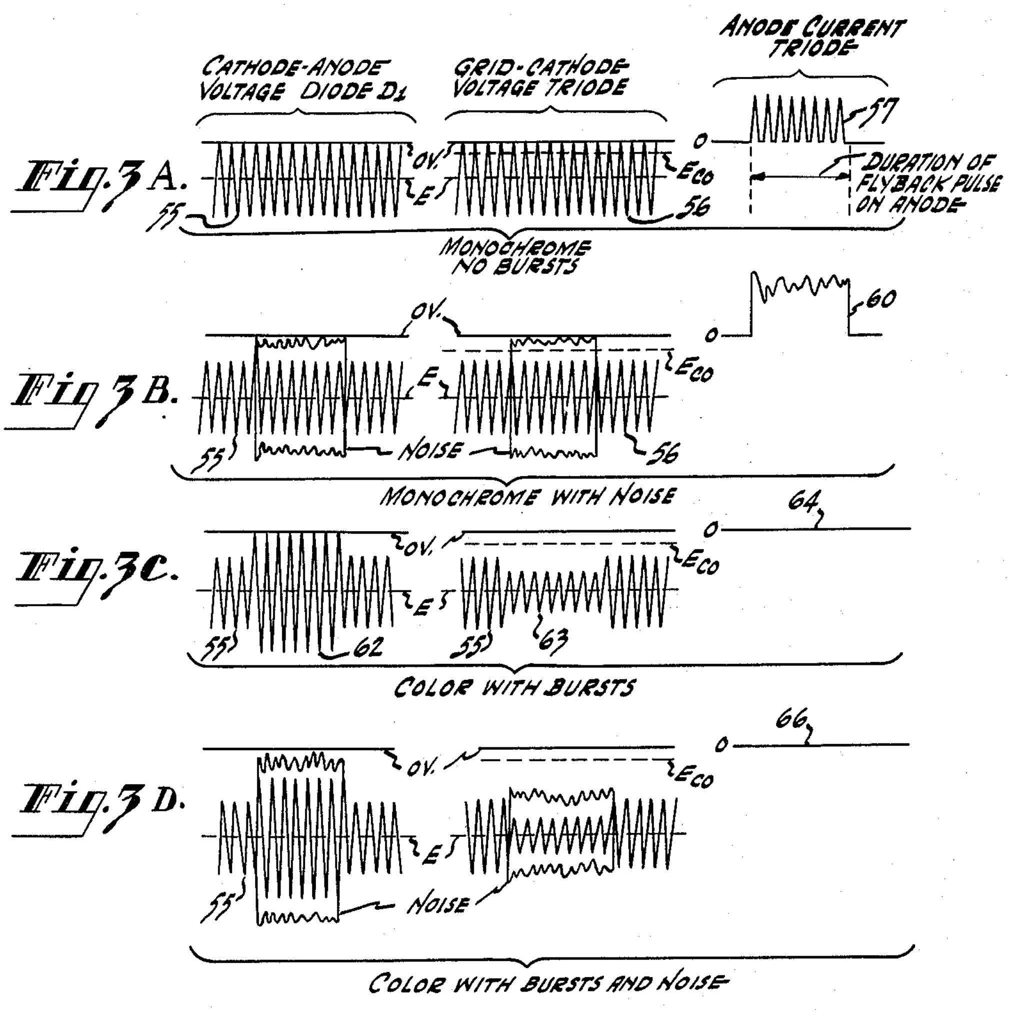
Figures 3A through 3D are waveform charts which will be referred to in describing the operation of the invention.

The operation of the synchronous color killer of Figure 1 will be described with reference to the signal charts of Figures 3A through 3D. Figure 3A shows signal wave forms when the monochrome signal is received not including bursts. The reference oscillations coupled through the transformer 37 to the diode $D_1$ appear as shown by the wave 55 across diode $D_1$. The diode $D_1$ rectifies the oscillations and generates a negative D.C. voltage E at point 43. The reference oscillations are also coupled from the transformer 37, through the 90° phase shift network 45, to the cathode of triode 42 to provide oscillations 56 between the grid and cathode of triode 42. The peaks of the oscillations 56 extend above the cutoff voltage $E_{co}$ so that the triode 42 conducts as shown by anode current waveform 57 for the duration of the positive flyback pulse applied over lead 47 to the anode of tube 42. The anode current waveform 57 is integrated or filtered to provide a steady negative D.C. voltage on lead 52 which is employed as a color killer voltage to bias the chroma amplifier 21 below cutoff.

Figure 3B shows the waveforms existing during receipt of the monochrome signal with noise applied to the color killer system during burst time. The noise applied through the burst channel to the diode $D_1$ causes an increased D.C. voltage E to be developed at point 43. This increased voltage E then biases triode 42 in the non-conducting direction by a correspondingly increased amount. The noise is also applied over lead 41 to the grid of triode 42 so that the triode conducts during the noise to provide an anode current waveform 60. The anode current 60 is similarly integrated or filtered to provide a negative color killer voltage on lead 52.

Figure 3C shows the waveforms existing when the received signal is a color signal including bursts. The oscillations 55 are applied to the cathode of diode $D_1$, and the bursts 62 are applied to the anode of diode $D_1$. The oscillations 55 and the bursts are in quadrature phase which by vector addition have a higher amplitude 62 than the oscillations alone. Furthermore, the bursts are normally of larger amplitude than the oscillations. Stated another way, the oscillations and bursts are in additive phase which results in a D.C. voltage E being developed at point 43. The D.C. voltage E negatively biases the grid of triode 42. The bursts applied over leads 28 and 41 to the grid of triode 42 are in subtractive phases with relation to the reference oscillations applied from transformer 37, through phase shifter 45, to the cathode of triode 42. The amplitude of the radio frequency voltage across the grid and cathode of triode 42 is thus reduced during burst time as shown at 63. The reduction in amplitude is due to the phase relation of the bursts and the reference oscillations, and is due to the fact that the bursts are synchronous with the oscillations. This is in contrast with the condition illustrated in 3B and showing the effect of noise. Noise is non-synchronous with the oscillations and always includes components which add to the peaks of the oscillations 56. When bursts are received as illustrated in Figure 3C, an increased negative bias E is applied to the triode 42, and a reduced R.F. voltage 63 is applied across the input electrodes of triode 42. Therefore, during burst time, and at all other times, the wave 63 remains far below the cutoff voltage $E_{co}$. As a result, triode 42 remains cut off as represented by the zero anode current line 64, and the CK voltage is zero.

Figure 3D illustrates the waveform existing when a color signal is received and noise is superimposed on the received bursts. The noise, being non-synchronous, adds to the oscillations 55 and the bursts applied to the diode $D_1$ so that a still greater negative D.C. voltage E is developed at point 43 and applied as a negative biasing voltage of the grid of triode 42. The non-synchronous noise also appears in additive fashion between the grid and cathode of triode 42 during burst time. However, the triode 42 does not conduct because the negative biasing voltage E is increased by the noise by the same amount that the noise adds to the R.F. signal applied across the grid and cathode of the triode 42. Therefore, no current flows through the triode 42 and a zero CK voltage 66 appears on lead 52 which is connected to the chroma amplifier 21.

It is thus apparent from Figures 3A through 3D that a negative color killer voltage is applied to the chroma amplifier 21 unless bursts are received, regardless of whether or not noise is received during burst time. Stated another way, a negative color killer voltage is applied to the chroma amplifier unless a burst is received which is synchronous with the oscillations from the reference oscillator 31. If bursts are received which are of such low amplitude that they cannot synchronize the oscillator 31, then the bursts are discriminated against by the color killer system in the same way that noise is discriminated against. This is a very desirable characteristic because a color picture cannot be reproduced unless the oscillator 31 is synchronized by the bursts. Therefore, if the oscillator is not synchronized by the bursts, the chroma amplifier 21 is killed.

Figure 4:
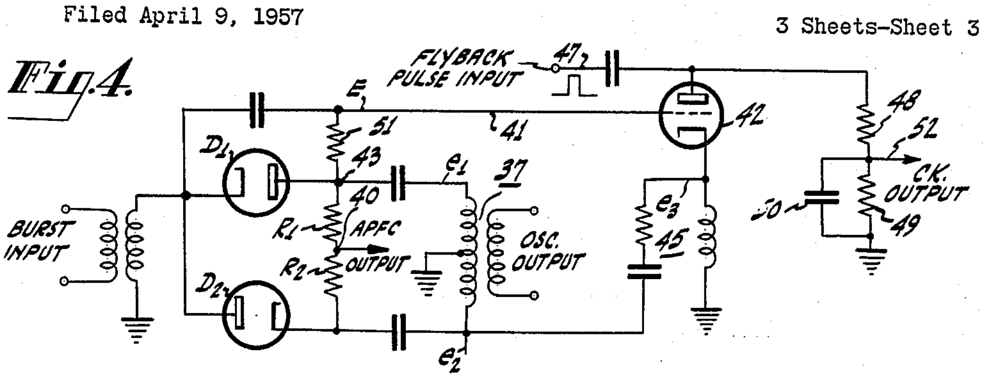
Figure 4 is a circuit diagram of the synchronous color killer incorporating a matrix type APFC balanced diode phase detector rather than an adder type APFC balanced diode phase detector as shown in Figure 1.

Figure 4 shows a circuit diagram of a color killer arrangement according to the invention wherein the automatic frequency control phase discriminator is of the matrix type. Functionally similar elements are given the same reference numerals as appear in the circuit of Figure 1. The balance point 40 in the phase detector normally provides a zero APFC voltage for the reactance tube circuit. The unbalance point 43 provides a D.C. voltage E which is proportional to the vector sum of the oscillations, the bursts, and noise appearing during burst time. The negative D.C. voltage E derived through isolating resistor 51 from unbalance point 43 is applied over lead 41 to the grid of triode 42 to bias the triode in the non-conducting direction. The bursts and oscillations are coupled in subtractive phase to input electrodes of the triode 42. A flyback pulse is applied over lead 47 to the anode of triode 42. The color killer output voltage appears on lead 52. The operation of the circuit of Figure 4 is basically the same as has been described in connection with the circuit of Figure 1.

Figure 5:
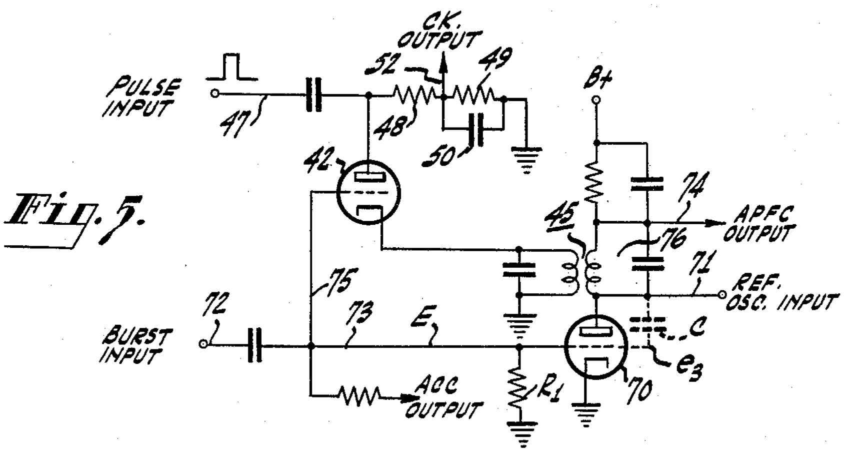
Figure 5 is another synchronous color killer arrangement incorporating a triode form of APFC phase detector.

Figure 5 ilustrates a synchronous color killer of this invention in combination with an automatic phase and frequency control (APFC) phase discriminator including a triode vacuum tube 70. The output of a color reference oscillator is applied over lead 71 to the anode of vacuum tube 70, from which it is coupled by interelectrode capacitance C to the grid of tube 70. Bursts are coupled from a terminal 72 through lead 73 to the grid of vacuum tube 70. The phases of oscillations and the bursts are compared in the vacuum tube 70 and an automatic phase and frequency control output for a reactance tube is provided on lead 74. The vacuum tube 70 acts as a rectifier having a load resistor R1 and develops a negative grid bias voltage E which is proportional to the vector sum of the oscillations, the bursts, and noise received during burst time. This negative D.C. voltage E is applied over leads 73 and 75 to the grid of color killer triode 42 to bias the triode in the non-conducting direction. Bursts are coupled from terminal 72 to the grid of triode 42, and oscillations are coupled from the plate circuit 76 of the vacuum tube 70 through a 90-degree shift network 45 to the cathode of the color killer triode 42. The oscillations coupled through the interelectrode capacitance C and leads 73 and 75 to the grid of triode 42 are compensated for by arranging the phase shift coupling circuit 45 to couple twice the amplitude of oscillations to the cathode of triode 42. The bursts and oscillations are applied to input electrodes of the color killer triode 42 in subtractive phases. A positive flyback pulse occurring during burst time is coupled from lead 47 to the anode of triode 42. A color killer voltage, for application to a chroma amplifier is available at lead 52.

Figure 6:
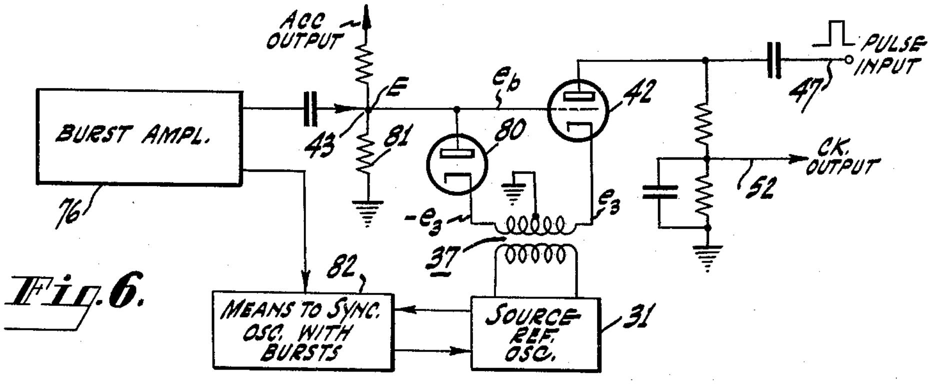
Figure 6 is a diagram of a synchronous color killer according to the invention employing a rectifying device not forming a part of an APFC phase detector.

Figure 6 illustrates the color killer system of this invention in the circuit including a diode 80 and a diode load 81 for providing the negative D.C. biasing voltage E. In the previously described circuits, the functions performed by the diode 80 and the diode load 81 are performed in Figures 1 and 4 by diode $D_1$ and diode load R1, and are performed in Figure 5 by triode 70 and load R1, which also form a part of an APFC phase detector for synchronizing the reference oscillator with the bursts. This latter function is performed in the circuit 56 by the means in box 82.

Reference oscillations are coupled from oscillator 31 through transformer 37 to the cathode of diode 80. Bursts from the burst amplifier 76 are coupled to the anode of diode 80. A negative direct current voltage E is developed at point 43 and is applied as a negative biasing potential to the grid of color killer triode 42. The bursts are coupled to the grid of triode 42, and the oscillations are coupled through transformer 37 to the cathode of triode 42. The phase of the bursts coupled from the burst amplifier 76 to the grid of triode 42, and the phase of the oscillations $e_3$ applied to the cathode of triode 42 are initially adjusted so that the bursts and oscillations applied to the input electrodes of triode 42 are in subtractive phases so far as conduction in triode 42 is concerned. The subtractive phases are preferably of such phase so that the effect in the triode 42 is for the bursts to subtract from the oscillations. Positive flyback pulses are applied to the anode of triode 42, and a color killer voltage is available at lead 52 for application to a chroma amplifier.

All circuit arrangements which have been shown and described include a color reference oscillator and means to synchronize the oscillator with incoming bursts. A rectifier and a rectifier load are employed to generate a D.C. voltage E which is proportional to the vector sum of the oscillations, the bursts, and noise received during burst time. This voltage E is employed to bias an amplifying device (triode 42) in the non-conducting direction. The oscillations and the bursts are applied to input electrodes of the amplifying device in subtractive phases, that is, so that the effect of one upon the other is to reduce conduction in the amplifying device. The amplifying device is energized during burst time and the amplifying device is provided with an output circuit which integrates or filters the current through the device to control a chroma amplifier stage.

What is claimed is:

1. In a color television receiver including a color signal developing portion having a controlling means for controlling the operability of said portion, and said receiver further including a source of local color reference oscillations which are synchronized with color reference bursts when bursts are received, means to deactivate said portion when bursts are not included in the received signal comprising, a rectifier device, a load impedance connected in circuit with said rectifier device, means to apply said bursts and said oscillations in additive phases to said rectifier device to develop a direct-current voltage across said load impedance, an amplifying device, means to apply said direct-current voltage to said amplifying device to bias said amplifying device in the non-conducting direction, means to apply said bursts and said oscillations in subtractive phases to said amplifying device, means to energize said amplifying device during burst time, and an output circuit for said amplifying device coupled to said controlling means.

2. In a color television receiver including a color signal developing portion having a controlling means for controlling the operability of said portion, and said receiver further including a source of local color reference oscillations which are synchronized with color reference bursts when bursts are received, means to deactivate said portion when bursts are not included in the received signal comprising, a rectifier device, a load impedance connected in circuit with said rectifier device, means to apply said bursts and said oscillations in quadrature phases to said rectifier device to develop a direct-current voltage across said load impedance, an amplifying device, means to apply said direct-current voltage to said amplifying device to bias said amplifying device in the non-conducting direction, means to apply said bursts and said oscillations in anti-quadrature phases to input electrodes of said amplifying device, means to energize said amplifying device during burst time, and an output circuit for said amplifying device coupled to said controlling means.

3. In a color television receiver including a chroma amplifier having a controlling means for controlling the operability of said portion, and said receiver further incuding a source of local color reference oscillations which are synchronized with color reference bursts when bursts are received, means to deactivate the chroma amplifier when bursts are not included in the received signal comprising, a rectifier device, a load impedance connected in circuit with said rectifier device, means to apply said bursts and said oscillations in additive phases to said rectifier device to develop a direct-current voltage across said load impedance, an amplifying device, means to apply said direct-current voltage to said amplifying device to bias said amplifying device in the non-conducting direction, means to apply said bursts and said oscillations in subtractive phases to said amplifying device, means to energize said amplifying device during burst time, and an output circuit for said amplifying device coupled to said controlling means.

4. In a color television receiver including a color signal developing portion having a controlling means for controlling the operability of said portion, and said receiver further including a source of local color reference oscillations which are synchronized with color reference bursts when bursts are received, means to deactivate said portion when bursts are not included in the received signal comprising, a diode, a load impedance connected in circuit with said diode, means to apply said bursts and said oscillations in additive phases to said diode to develop a negative direct-current voltage across said load impedance, a vacuum tube including cathode, grid and anode electrodes, means to apply said direct-current voltage to the grid of said vacuum tube, means to apply said bursts and said oscillations in subtractive phases to the grid and cathode of said vacuum tube, a source of flyback pulses connected to energize said vacuum tube during burst time, and an output circuit connected to said anode and to said controlling means.

5. In a color television receiver, the combination of: a color signal developing portion having a controlling means for controlling the operability of said portion, a source of color reference bursts providing a burst output when bursts are present in the received signal, a source of continuous local color reference oscillations, phase comparator means coupled to said sources to provide an output voltage indicative of the phase difference between the two sources, and means responsive to the output of said phase comparator to maintain said source of oscillations in synchronism and fixed phase with said bursts when bursts are received, said phase comparator including a terminal at which a direct current voltage is developed which is proportional to the vector sum of said oscillations plus said bursts, an amplifier device, means connecting said direct-current voltage to bias said amplifier device in the non-conducting direction, means coupling said sources in subtractive phases to said amplifier device, means to energize said amplifier device during burst time, and an output circuit for said amplifier device coupled to said controlling means.

6. In a color television receiver, the combination of: a color signal developing portion having a controlling means for controlling the operability of said portion, a source of color reference bursts providing a burst output when bursts are present in the received signal, a source of continuous local color reference oscillations, phase comparator means coupled to said sources to maintain said source of oscillations in synchronism and fixed phase with said bursts when bursts are received, said phase comparator including a rectifier to which said bursts and oscillations are applied in additive phases, a load coupled to said rectifier to produce a direct-current voltage which is proportional to the vector sum of said oscillations plus said bursts, an amplifier device, means connecting said direct-current voltage to bias said amplifier device in the non-conducting direction, means coupling said sources in subtractive phases to said amplifier device, means to energize said amplifier device during burst time, and an output circuit for said amplifier device coupled to said controlling means.

7. In a color television receiver, the combination of: a color signal developing portion having a controlling means for controlling the operability of said portion, a source of color reference bursts providing a burst output when bursts are present in the received signal, a source of continuous local color reference oscillations, phase comparator means coupled to said sources to maintain said source of oscillations in synchronism and fixed phase with said bursts when bursts are received, said phase comparator including a rectifier to which said bursts and oscillations are applied in quadrature phases, a load connected to said rectifier to produce a direct-current voltage which is proportional to the vector sum of said oscillations plus said bursts, an amplifier device, means connecting said direct-current voltage to bias said amplifier device in the non-conducting direction, means coupling said sources in subtractive phases to said amplifier device, means to energize said amplifier device during burst time, and an output circuit for said amplifier device coupled to said controlling means.

8. In a color television receiver, the combination of: a color signal developing portion having a controlling means for controlling the operability of said portion, a source of color reference bursts providing a burst output when bursts are present in the received signal, a source of continuous local color reference oscillations, a balanced phase detector coupled to said sources and having a balance point providing an output voltage indicative of the phase difference between the two sources, and means responsive to the voltage from said balance point to maintain said source of oscillations in synchronism and fixed phase with said bursts when bursts are received, said phase detector including an unbalance point at which a direct-current voltage is developed which is proportional to the vector sum of said oscillations plus said bursts, an amplifier device, means connecting said direct-current voltage to bias said amplifier device in the non-conducting direction, means coupling said sources in subtractive phases to said amplifier device, a source of flyback pulses coupled to energize said amplifier device during burst time, and an output circuit for said amplifier device coupled to said controlling means.

9. In a color television receiver, the combination of: a color signal developing portion having a controlling means for controlling the operability of said portion, a source of color reference bursts providing a burst output when bursts are present in the received signal, a source of continuous local reference oscillations, phase comparator means coupled to said sources to maintain said source of oscillations in synchronism and fixed phase with said bursts when bursts are received, said phase comparator including a rectifier means having electrodes to which said bursts and oscillations are applied in quadrature relation, a load connected to said rectifier to produce a direct-current voltage which is proportional to the vector sum of said oscillations plus said bursts, an amplifier device having input electrodes, means connecting said direct-current voltage to bias said amplifier device in the non-conducting direction, means coupling said sources in the same phase to the input electrodes of said amplifier device, means to energize said amplifier device during burst time, and an output circuit for said amplifier device coupled to said controlling means.

References Cited in the file of this patent

UNITED STATES PATENTS

| | | |
|---|---|---|
| 2,681,379 | Schroeder | June 15, 1954 |
| 2,835,728 | Flood | May 20, 1958 |

OTHER REFERENCES

RCA Color Television Receiver, Model CT-100, March 1954, pages 31 to 34. (Copy in Division 41.)